United States Patent
Withey et al.

(10) Patent No.: US 10,076,784 B2
(45) Date of Patent: Sep. 18, 2018

(54) LIQUID DEVICE HAVING FILTER

(71) Applicant: Rolls-Royce Corporation, Indianapolis, IN (US)

(72) Inventors: Paul Anthony Withey, Derby (GB); Max Eric Schlienger, Napa, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 637 days.

(21) Appl. No.: 14/571,033

(22) Filed: Dec. 15, 2014

(65) Prior Publication Data
US 2015/0209860 A1    Jul. 30, 2015

Related U.S. Application Data

(62) Division of application No. 12/852,238, filed on Aug. 6, 2010, now abandoned.

(60) Provisional application No. 61/231,900, filed on Aug. 6, 2009.

(51) Int. Cl.
  *B22D 37/00* (2006.01)
  *C22B 9/02* (2006.01)
  *C22B 21/06* (2006.01)

(52) U.S. Cl.
  CPC ............. *B22D 37/00* (2013.01); *C22B 9/023* (2013.01); *C22B 21/066* (2013.01); *Y02P 10/234* (2015.11)

(58) Field of Classification Search
  CPC ........ B22D 37/00; C22B 9/023; C22B 21/066
  See application file for complete search history.

(56) References Cited

U.S. PATENT DOCUMENTS

| | | |
|---|---|---|
| 3,111,732 A | 11/1963 | Schroder et al. |
| 3,430,680 A | 3/1969 | Leghorn |
| 3,663,730 A | 5/1972 | Gates |
| 4,174,826 A | 11/1979 | Buxmann et al. |
| 4,449,568 A | 5/1984 | Narasimham |
| 4,573,664 A | 3/1986 | Prendergast |
| 4,708,326 A | 11/1987 | Brockmeyer et al. |
| 4,789,140 A | 12/1988 | Lirones |

(Continued)

FOREIGN PATENT DOCUMENTS

| | | |
|---|---|---|
| EP | 0453079 | 10/1991 |
| WO | 2009092283 | 7/2009 |

OTHER PUBLICATIONS

Examination Report from counterpart European Application No. 10807248.9, dated Feb. 17, 2016, 4 pp.

(Continued)

*Primary Examiner* — Lois Zheng
(74) *Attorney, Agent, or Firm* — Shumaker & Sieffert, P.A.

(57) ABSTRACT

A liquid containing receptacle having a filter is disclosed that in one form includes a nozzle. The filter includes a passage having a portion with a size that restricts the flow of a liquid there through unless sufficient pressure is applied to overcome a liquid and filter property such as surface tension. The pressure in the liquid at the filter can be varied by changing a gas overpressure above a surface of the liquid, changing a head height of the liquid, and/or changing the liquid and filter property, among possible others. In one embodiment the liquid containing receptacle can be used to contain a molten metal that is used in an investment casting mold. The molten metal can be selectively poured into a mold by selectively changing pressure of the molten metal at the filter or by changing the pressure at which molten metal flows through the filter.

18 Claims, 2 Drawing Sheets

(56) References Cited

U.S. PATENT DOCUMENTS

| | | |
|---|---|---|
| 4,909,836 A | 3/1990 | El-Kaddah |
| 5,139,238 A | 8/1992 | Buhr |
| 5,174,360 A | 12/1992 | Barbe |
| 5,178,205 A | 1/1993 | Fukase et al. |
| 5,202,081 A | 4/1993 | Lake et al. |
| 5,207,974 A | 5/1993 | Yun |
| 5,310,098 A | 5/1994 | Edwards |
| 5,348,071 A | 9/1994 | Cook |
| 5,390,724 A | 2/1995 | Yamauchi et al. |
| 5,676,731 A | 10/1997 | Hitchings |
| 5,820,772 A | 10/1998 | Freitag et al. |
| 5,921,311 A | 7/1999 | Menendez et al. |
| 6,073,817 A | 6/2000 | Jairazbhoy |
| 6,203,593 B1 | 3/2001 | Tanuma et al. |
| 6,224,818 B1 | 5/2001 | Hitchings et al. |
| 6,468,326 B1 | 10/2002 | Bonvin et al. |
| 2003/0066851 A1 | 4/2003 | Muroi et al. |
| 2004/0231822 A1 | 11/2004 | Frasier et al. |
| 2006/0113059 A1 | 6/2006 | Kendall |
| 2008/0169081 A1 | 7/2008 | Frasier et al. |
| 2010/0180726 A1 | 7/2010 | Yan |
| 2011/0049197 A1 | 3/2011 | Withey et al. |

OTHER PUBLICATIONS

Response to Extended Search Report dated Feb. 17, 2016, from counterpart European Application No. 10807248.9, filed Jun. 9, 2016, 12 pp.

Supplemental European Search Report, EP 10 80 7248, dated Jul. 23, 2013.

Prosecution History from U.S. Appl. No. 12/852,238, dated from Oct. 25, 2011 through Aug. 13, 2014, 83 pp.

LIQUID DEVICE HAVING FILTER

CROSS REFERENCE TO RELATED APPLICATIONS

The present application is a divisional of U.S. Non-Provisional application Ser. No. 12/852,238, filed Aug. 6, 2010, which claims the benefit of U.S. Provisional Patent Application 61/231,900, filed Aug. 6, 2009, and is incorporated herein by reference.

FIELD OF THE INVENTION

The present invention generally relates to liquid containers having filters, and more particularly, but not exclusively, to liquid containers operable to selectively dispense liquid through the filter.

BACKGROUND

The ability to control a pour from a liquid container through a filter remains an area of interest. Some existing systems have various shortcomings relative to certain applications. Accordingly, there remains a need for further contributions in this area of technology.

SUMMARY

One embodiment of the present invention is a unique liquid containing receptacle. Other embodiments include apparatuses, systems, devices, hardware, methods, and combinations for selectively pouring liquid from the liquid containing receptacle. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
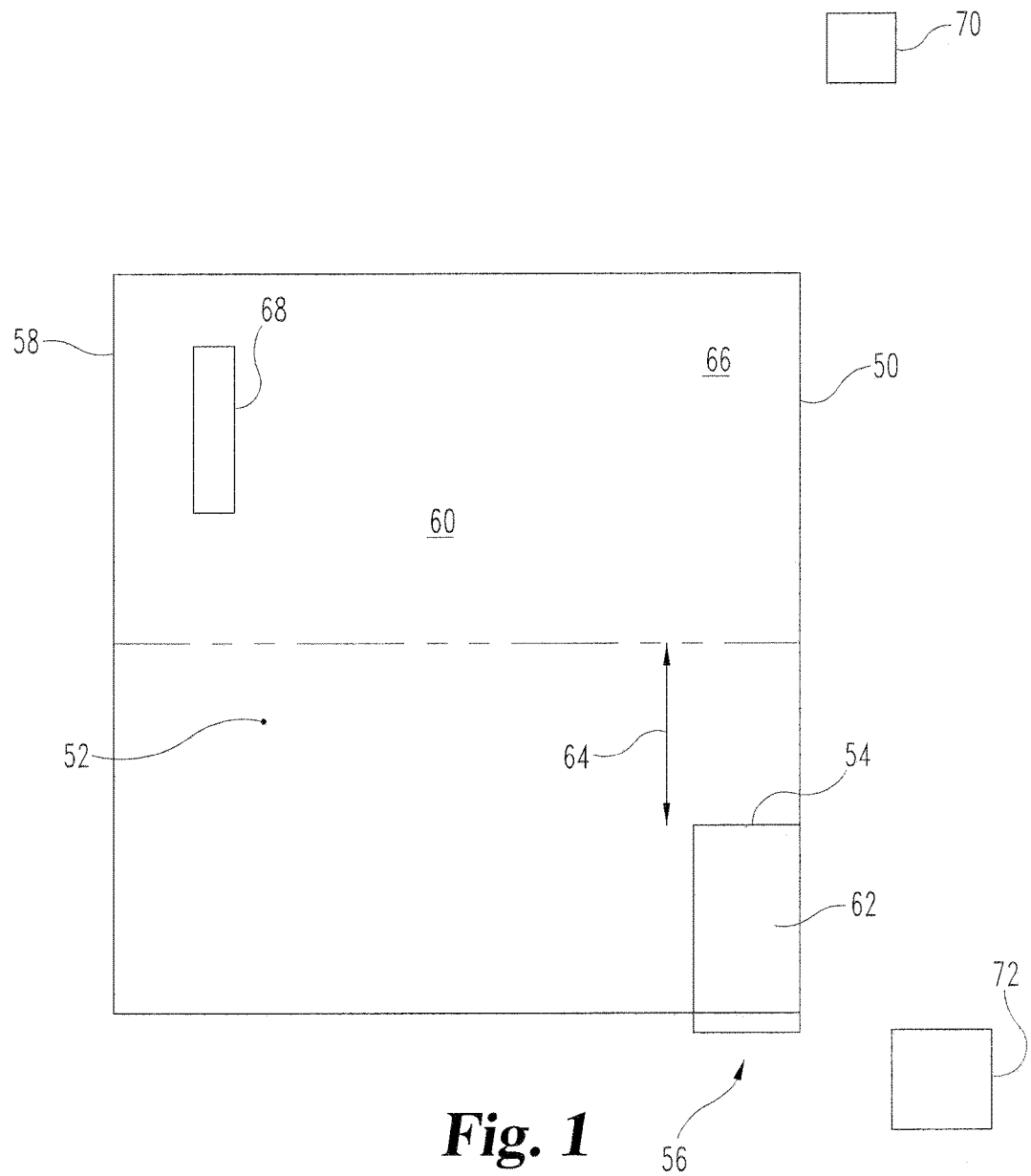
FIG. 1 depicts one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a liquid containing receptacle 50 for enclosing a liquid 52 is shown in schematic form, and a filter 54 and an exit 56 is shown through which the liquid may pass from the liquid containing receptacle 50. The liquid containing receptacle 50 includes at least one side 58 that define a space 60 for containing the liquid. The at least one side 58 can include one or more surfaces that define the space 60. To set forth just a few non-limiting examples, the liquid containing receptacle 50 can resemble a bowl that in one embodiment might only have a single inside surface, or can include multiple sides as in a box-like container. In operation the liquid 52 can be either poured into the liquid containing receptacle 50 or can be melted within.

The filter 54 is coupled with the liquid containing receptacle 50 and is positioned to filter at least part of the liquid 52 before the liquid 52 is discharged from the liquid containing receptacle 50. Though only one filter 54 is depicted, in some embodiments the liquid containing receptacle 50 may include more than one. The filter 54 can be glued into the liquid containing receptacle 50, but other techniques of attachment can also be used. In some forms the filter 54 may simply be placed within the liquid containing receptacle 50 without the use of mechanical or chemical fasteners, among other devices. In some applications the filter 54 can be replaced after a single use, but in other applications the filter 54 can be used for multiple pours of the liquid 52. The filter 54 can take a variety of forms and generally includes a number of passages 62 through which the liquid 52 is capable of passing. One form of the present application contemplates a ceramic filter for use with a molten metal material. The present application further contemplates a filter made of materials other than ceramic. Further, the present application contemplates the application of the present inventions with a vast variety of melt materials including, but not limited to, metals and intermetallic materials. In considering the term metal in association with the melt and supporting structure it is contemplated herein that the term metal with include elemental metal, alloys, superalloys and intermetallic materials unless specifically provided to the contrary. The passages 62 can be internal to the filter 54 in some embodiments and in other embodiments may include portions formed between the filter 54 and structure coupled to the liquid containing receptacle 50, such as a side of a nozzle (not shown). The filter 54 can be formed of a variety of materials.

The passages 62 of the filter 54 can include a portion or portions having a size that discourages passage of the liquid 52 by virtue of a liquid property of the liquid, such as a surface tension. The passages 62 need not be uniform and need not have consistent shapes, though in some embodiments the passages 62 may be either or both uniform and consistent in shape. In some forms the surface tension will be of sufficient force to discourage passage of the liquid when the liquid is under pressure. However, pressure within the liquid can be increased to overcome the flow resistance of the liquid property to allow liquid 52 to flow through the filter 54. The pressure of the liquid 52 at which the liquid flows through the filter 54 can be referred to as a starting flow pressure. Values, therefore, below the starting flow pressure are insufficient to cause liquid 52 to flow through the filter 54 and values above the starting flow pressure permit liquid 52 to flow through the filter 54. The present application fully contemplates that the use of the word filter includes the separation of a contaminant from a material, and/or the control of the passage of a material irrespective of whether any contaminant is removed or separated. In one alternative embodiment the filter 54 is operable as a flow control device without the removal of contaminants from the flowable material.

The pressure of the liquid 52 is created by a head height 64 of the liquid 52 and can be supplemented by a pressure of a gas 66 that fills the space 60 above the surface of the liquid 52. In some applications a head height member 68 can be used to vary the head height of the liquid 52. In some forms the head height member 68 operates by decreasing the horizontal space available for the liquid 52 such that the surface of the liquid 52 is caused to rise. The head height member 68 can be a plunger that reciprocates vertically.

Other forms of varying the head height are contemplated herein. The gas 66 can be relatively pressurized by a pressure source such as a tank or compressor (not shown).

In some forms the liquid 52 can flow through the filter 54 by introducing an agent 70 to the liquid 52 such that the starting flow pressure of the liquid 52 is changed. The agent 70 can take the form of a surfactant and can change the surface tension properties of the liquid 52. In some forms the agent can be a solid or a fluid when added to the liquid containing receptacle 50. The agent 70 can be added in a variety of amounts and at a variety of rates. In some applications the agent 70 can be stirred into the liquid 52. Adding the agent 70 while also changing head height and/or overpressure of the gas 66 can be used to modulate and/or achieve the starting flow pressure.

In still other forms the liquid 52 can flow through the filter 54 when its temperature changes resulting in a change in the surface tension property of the liquid 52. Thus, the temperature, surface properties, head height and/or overpressure can be used either singly or in some type of combination to modulate and/or achieve the starting flow pressure.

The liquid containing receptacle 50 can be used to house the liquid 52 before it is filtered and dispensed to a receiving receptacle 72. The receiving receptacle 72 can be the final destination for the liquid 52 or can be an intermediate destination. In one form the receiving receptacle 72 is a mold useful for receiving the liquid 52 before being cooled into a shaped solid form. In one non-limiting example the receiving receptacle 72 is a ceramic mold produced using free form fabrication techniques and shaped to form a gas turbine engine component part such as a blade or vane when liquid poured from liquid containing receptacle 50 is cooled within the mold. Such a component can be used in gas turbine engines used to power aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

In operation the filter 54 is useful to discourage an undesirable impurity within the liquid 52 from exiting the liquid containing receptacle 50 and entering the receiving receptacle 72. The filter 54 can also be used to selectively pour the liquid 52 into the receiving receptacle 72 when sufficient pressure is applied at the filter 54 and/or other changes are affected as discussed hereinabove.

Figure 2:
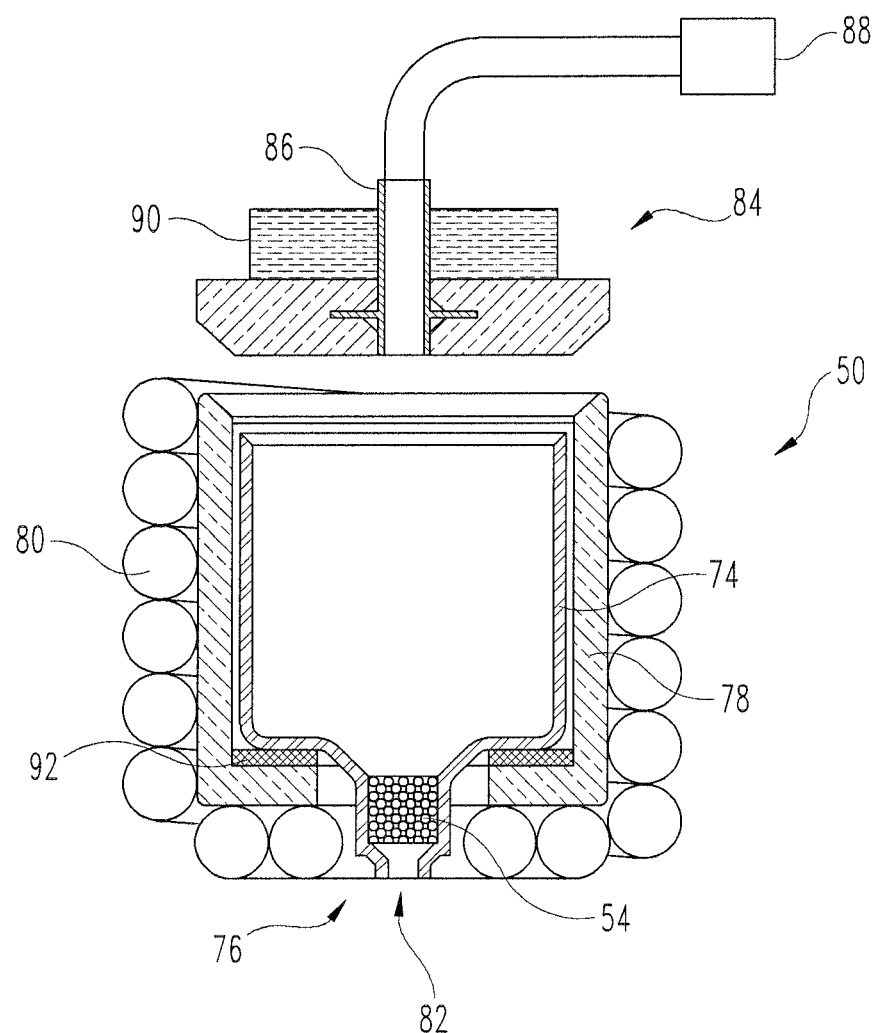
FIG. 2 depicts another embodiment of the present application.

Turning now to FIG. 2, one embodiment of the liquid containing receptacle 50 is shown in the form of a device capable of producing a liquid metal. The liquid containing receptacle 50 includes a crucible 74, the filter 54, a pouring nozzle 76, housing 78, and heater 80. In some applications the crucible 74 can be used to heat and retain a liquid metal as part of an investment casting process. The crucible 74 can be used for multiple pours of the liquid metal or can be configured to be disposable such that it is discarded after a single pour, or perhaps after a plurality of pours. The crucible 74 includes the nozzle 76 in the illustrative embodiment but in other embodiments the nozzle 76 can be a separate structure that is coupled or contacts the crucible 74. The nozzle 76 includes an exit aperture 82 capable of dispensing liquid 52 after passing through the filter 54. In some embodiments the liquid containing receptacle 50 need not include the nozzle 76 but otherwise will still have some type of exit aperture or apertures 82.

In the illustrative embodiment the filter 54 is installed near the exit aperture 82 of the nozzle. In other embodiments the filter can have any variety of shapes and can extend beyond the boundaries indicated in the illustrative embodiment.

The crucible 74 is received within the housing 78 and the heater 80 is used to provide heat to the crucible 74 to melt a metallic solid and/or maintain the metal in liquid form. The housing 78 can directly contact or can be coupled through other structure to the crucible 74. The heater 80 can be a separate device disposed external to the housing 78 but in some embodiments can be incorporated with the housing 78. In addition, though in the illustrative embodiment the heater 80 is depicted as an induction coil, in different embodiments the heater 80 can take on a variety of other forms.

In the illustrative embodiment the liquid containing receptacle 50 can include a cover 84 useful for enclosing the liquid containing receptacle 50. The cover 84 can interact with the housing 78 to create an enclosure above a liquid level within the crucible 74. Gas, if any, trapped in the enclosure can increase in pressure with an increase in temperature. In one form the cover 84 can have tapered surface to discourage gas leaving the liquid containing receptacle 50. The tapered surface can engage either or both the housing 78 and crucible 74. In some embodiments, as in the illustrative form, the cover 84 can also include a conduit 86 capable of flowing a gas to the enclosure. In one form the gas is an inert gas but can take on other forms in different embodiments. Though the conduit 86 is shown disposed within the cover 84, in some embodiments the conduit 86 can be relatively fixed to the housing 78.

The cover 84 includes a weight 90 in the illustrative embodiment, but some embodiments may lack such a weight. The weight 90 can be used to provide a downward force on the cover 84 to prevent it from raising and allowing gas to escape from the enclosure. In some embodiments weight 90 can be selected to permit the cover 84 to lift at a relief pressure to permit gas to escape. In some embodiments of the liquid containing receptacle, however, the cover can be locked in place during operation.

In some forms a seal 92 can be used between the housing 78 and the crucible 74 and can be useful to discourage pressurized gases from exiting the housing 78. In some embodiments the seal 92 discourages excessive blow by. The seal 92 can take a variety of forms and can be used in locations other than that depicted in FIG. 2. In some operations, pressurized gas can be used to drive the crucible 74 into the seal 92 to increase the effectiveness of the seal 92.

A pressure source 88 can be used to vary the pressure inside the enclosure. The pressure source 88 can be a pressurized tank, compressor, or other device and in some forms can raise and/or lower the pressure.

Though not illustrated, this embodiment can additionally and/or alternatively include a head height member 68 or other device useful in changing head height. Furthermore, the embodiment can additionally and/or alternatively include the agent 70.

In one embodiment the present application includes a bottom pour crucible prepared with a filter glued within it such that any material flowing out of the bottom of the crucible must pass through the filter. Into this crucible a metal charge is placed. The crucible and charge are then loaded into a furnace wherein the crucible placement lies within a pressure boundary encased by an induction coil.

The induction coil is used to melt the metal in the crucible. Although the metal is molten, surface tension prevents the liquid metal from flowing through the filter and the molten metal is thereby contained within the crucible. Once fully molten, power is applied to raise the temperature of the resultant liquid metal to a desired level. Once conditions are determined to be correct, a lid is lowered over the pressure boundary and the crucible is pressurized, thus forcing metal through the filter and into the mold below. The crucible is then removed and another takes its place in order to prepare for the next poring sequence.

One aspect of the present application provides an apparatus for discharging a melt comprising a molten metal container for holding a liquid and a nozzle located near a bottom of the molten metal container operable to dispense the liquid, the nozzle having an exit aperture through which the liquid passes when being dispensed from the molten metal container, a filter having a portion positioned within the molten metal container upstream of the nozzle exit aperture and operable to extract an impurity from the liquid as the liquid passes through the filter before being dispensed from the molten metal container, and wherein during operation a filter-fluid interaction discourages liquid from passing through the filter at a non-flow pressure present in the liquid and the filter-fluid interaction permits liquid from passing through the filter at a flow pressure.

Another aspect of the application provides an apparatus comprising a container operable to hold a molten metal liquid and having a dispensing orifice capable of flowing the molten metal liquid from the container, a plurality of flow paths disposed within the container and so dimensioned that the molten metal liquid is discouraged from flowing through at least some of the plurality of flowpaths at a first liquid pressure and permitted to flow through at least some of the plurality of flow paths at a second liquid pressure, and wherein the plurality of flow paths are structured to extract an impurity from the molten metal liquid before the molten metal liquid is dispensed from the container.

Yet another aspect of the application provides an apparatus comprising an casting crucible having a nozzle for dispensing a molten metal and a pressure-operative control device positioned upstream from an outlet of the nozzle, the pressure-operative control device operable to flow the molten metal at a first molten metal pressure and to discourage flow of molten metal at a second molten metal pressure, and means for changing a flowable pressure of a molten metal at the pressure-operative filter to cause the molten metal to flow from the nozzle.

Still another aspect of the application provides a method comprising depositing a metal within a crucible having an internal filter, heating the metal within the crucible during a liquid state of the metal, and selectively flowing the metal through the internal filter to remove impurities prior to being discharged from the crucible, the selectively flowing dependent upon whether a pressure in the metal is above or below a flowable pressure of the filter.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
providing a molten metal having a liquid pressure to a receptacle including an exit aperture, wherein a filter is positioned at least partially upstream of the exit aperture, and wherein the filter comprises a flow control device structured to discourage flow of the molten metal through the filter when the liquid pressure is less than a starting flow pressure, and to permit the molten metal to flow through the filter when the liquid pressure is greater than the starting flow pressure;
maintaining the liquid pressure below the starting flow pressure to retain the molten metal within the receptacle;
altering a surface tension of the molten metal to reduce the starting flow pressure; and
maintaining the liquid pressure above the reduced starting flow pressure to cause the molten metal to flow through the filter.

2. The method of claim 1, wherein the altering includes adding to the molten metal an agent formulated to reduce the surface tension property.

3. The method of claim 2, wherein the agent includes one of a solid surfactant and a liquid surfactant.

4. The method of claim 1, wherein the altering includes increasing a temperature of the molten metal, thereby reducing the surface tension property.

5. The method of claim 1, wherein the providing the molten metal comprises depositing a metallic solid in the receptacle, and melting the metallic solid.

6. The method of claim 1, further comprising extracting, with the filter, impurities from the molten metal as the molten metal flows through the filter.

7. The method of claim 1, wherein the maintaining the liquid pressure above the reduced starting flow pressure includes lowering a plunger into the molten metal.

8. The method of claim 1, wherein the maintaining the liquid pressure above the reduced starting flow pressure comprises increasing the liquid pressure of the molten metal to a value greater than the reduced starting flow pressure.

9. A method, comprising:
providing a molten metal to a crucible including an exit aperture and a filter at least partially upstream of the exit aperture, wherein the filter comprises a flow control device comprising a plurality of passages structured to discourage the molten metal from flowing through the passages when a liquid pressure is less than a starting flow pressure, and to permit the molten metal to flow through the passages when the liquid pressure is greater than the starting flow pressure;
maintaining a liquid pressure of the molten metal below the starting flow pressure to retain the molten metal in the crucible;
adding a surfactant to the molten metal to modulate the starting flow pressure; and
modulating the liquid pressure of the molten metal relative to the starting flow pressure to cause the molten metal to flow through the filter;

wherein the modulating the liquid pressure of the molten metal includes lowering a head height member into the molten metal, thereby raising a head height of the molten metal and increasing the liquid pressure of the molten metal.

10. The method of claim 9, further comprising maintaining the modulated liquid pressure of the molten metal above the modulated starting flow pressure to cause the molten metal to flow through the filter.

11. The method of claim 9, wherein modulating the liquid pressure of the molten metal includes increasing a gas pressure in the crucible.

12. The method of claim 11, wherein increasing the gas pressure includes flowing a pressurized gas into the crucible.

13. The method of claim 12, further comprising enclosing the crucible with a cover, and, in response to the gas pressure exceeding a relief pressure, lifting the cover, thereby permitting at least some of the pressurized gas to escape the crucible.

14. The method of claim 13, further comprising providing the cover with a weight selected to permit the cover to lift in response to the gas pressure exceeding the relief pressure.

15. The method of claim 12, further comprising providing a seal between the crucible and a housing, wherein the pressurized gas urges the crucible into the seal.

16. A method, comprising:
depositing a solid metal into a crucible including an exit aperture and a filter within the exit aperture, wherein the filter comprises a flow control device configured to prevent fluid flow through the filter at liquid pressures less than a starting flow pressure, and to permit fluid flow through the filter at liquid pressures greater than the starting flow pressure;
heating the crucible, thereby melting the solid metal to a molten metal, the molten metal having a liquid pressure less than the starting flow pressure;
modulating a surface tension of the molten metal to modulate the starting flow pressure and cause the molten metal to flow through the filter;
wherein the modulating the surface tension of the molten metal includes at least one of increasing a temperature of the molten metal or adding a surfactant to the molten metal.

17. The method of claim 16, wherein heating the crucible includes supplying a first power to an induction coil, modulating the liquid pressure of the molten metal includes increasing the temperature of the molten metal, and increasing the temperature of the molten metal includes supplying a second, greater power to the induction coil.

18. The method of claim 17, wherein modulating the liquid pressure of the molten metal further includes, after the increasing the temperature of the molten metal, enclosing the molten metal within a pressure boundary, and subsequently introducing a pressurized gas into the pressure boundary.

* * * * *